3,029,241
PHENYLPIPERAZINYLACYL ANILINES
Otis E. Fancher and Robert N. Schut, Elkhart, Ind., assignors to Miles Laboratories, Inc., Elkhart, Ind., a corporation of Indiana
No Drawing. Filed Nov. 16, 1959, Ser. No. 852,965
6 Claims. (Cl. 260—268)

This invention relates to new and useful compositions of matter and particularly to substituted phenylpiperazinylacyl anilines which possess sedative and antihypertensive properties.

More specifically, the new compounds may be designated as N-(4-phenyl-1-piperazinylacyl)anilines and represented by the following structural formula:

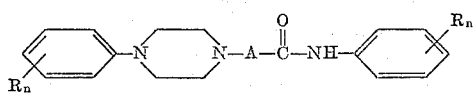

wherein A represents a straight or branched chain, divalent saturated aliphatic hydrocarbon group containing 2 to 4 carbon atoms, R represents hydrogen, fluorine, chlorine or bromine atoms or lower alkyl, lower alkoxy or hydroxy radicals, and $n$ may be 0 to 3.

The above-defined anilines may be prepared by reacting a chloro-substituted acid chloride with a substituted aniline to produce a N-chloroacyl)aniline and reacting this intermediate anilide with N-phenylpiperazine.

The mode of formation may be graphically presented by the following equation:

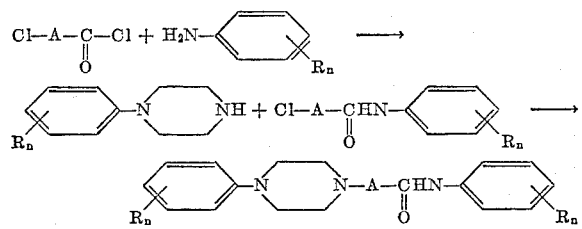

wherein A, R and $n$ have the meanings given hereinabove.

Moreover, it has been found that the compounds of this class can also be prepared by reacting phenylpiperazine with an appropriate halogenated alkyl cyanide or alkenyl cyanide to produce a 1-phenyl-4-($\omega$-cyanoalkyl) piperazine, hydrolyzing this nitrile compound to a $\omega$-(4-phenyl-1-piperazinyl)alkanoic acid and reacting this intermediate compound with a substituted aniline to obtain the desired substituted phenylpiperazinylacyl aniline.

The present compounds may be obtained as free bases having the formula given above or preferably, for therapeutic use, as non-toxic, water-soluble addition salts of halogen acids, sulfuric acid, maleic acid and the like.

These new compounds and the methods for their preparation may be exemplified more specifically by the following illustrative examples:

EXAMPLE I

N-(p-Methoxyphenyl)-3-(4-Phenyl-1-Piperazinyl)-
Propionamide and Hydrochloride

A. N-(p - methoxyphenyl)-3-chloropropionamide.—A solution of 45 g. (0.35 mole) of β-chloropropionyl chloride in 200 ml. of ether was added to a stirred mixture of 41 g. (0.33 mole) of p-anisidine in 200 ml. of ether and 100 ml. of 40% sodium hydroxide solution over a 2-hour period at 10–20°. The mixture was stirred at this temperature an additional hour. The solid white material was filtered, washed with ether and water to give 59 g. (84%) of N-(p-methoxyphenyl)-3-chloropropionamide, M.P. 119–120°. Recrystallization from water gave the analytical sample in the form of white plates, M.P. 121–122°. Analysis.—Calcd. for $C_{10}H_{12}ClNO_2$: N, 6.54. Found: N (Kjeldahl), 6.55.

The other chloroamides used in the synthesis of compounds given below were prepared in the same way except that chloroform was used as the solvent. The chloroamides were then isolated by concentration of the chloroform layer. The crude product obtained in each case was purified by recrystallization from aqueous methanol. The yields and melting points were (a) N-(3,4,5-trimethoxyphenyl)-3-chloropropionamide (51%), M.P. 119–120° and (b) N-(3,4,5-trimethoxyphenyl)chloroacetamide (56%), M.P. 113–114°.

B. N-(p-methoxyphenyl)-3-(4-phenyl-1-piperazinyl)propionamide.—To a hot solution of 35.6 g. (0.22 mole) of N-phenylpiperazine and 42.8 g. (0.20 mole) of N-p-methoxyphenyl)-3-chloropropionamide in 300 ml. of isopropyl alcohol was added 50 g. (0.47 mole) of anhydrous sodium carbonate. The mixture was stirred and heated under reflux for 12 hours. The mixture was cooled, 500 ml. of water was added and the solid material was filtered and washed with water to give 60 g. (88%) of N-p-methoxyphenyl) - 3 - (4-phenyl-1-piperazinyl)propionamide, M.P. 172–173°. For analysis a sample was recrystallized from aqueous methanol in the form of white powder, M.P. 173–174°. Analysis.—Calcd. for $C_{20}H_{25}N_3O_2$: N, 12.39. Found: N (Kjeldahl), 12.57.

A 55 g. sample of the piperazinyl amide was suspended in 500 ml. of methanol. Hydrogen chloride (40 g.) was added to the amide suspension and the mixture was heated on the steam bath for 15 minutes. After cooling, the white crystalline material was filtered, washed with methanol and dried to give 53 g. (80%) of the monohydrochloride, M.P. 261–262° (dec.). Analysis.—Calcd for $C_{20}H_{26}ClN_3O_2$: Cl, 9.44. Found: Cl, 9.43.

The other piperazinylamides were prepared according to the foregoing procedure. The hydrochloride in each case was prepared by adding a 4- to 5-fold excess of hydrogen chloride in isopropyl alcohol to a suspension of the piperazinylamide in isopropyl alcohol. Recrystallization of the crude product from 90% isopropyl alcohol gave the nicely crystalline monohydrochloride.

EXAMPLE II

N-(3,4,5-Trimethoxyphenyl)-3-(4-Phenyl-1-Piperazinyl)
Propionamide and Hydrochloride This was prepared by the procedure of Example I using N-(3,4,5-trimethoxyphenyl)-3-chloropropionamide and N-phenylpiperazine. The free base was obtained in 89% yield and melted at 143–145°. The monohydrochloride melted at 223–224°. Analysis.—Calcd. for $C_{22}H_{30}ClN_3O_4$:

Cl, 8.14. Found: Cl, 8.29.

EXAMPLE III

N-(3,4,5-Trimethoxyphenyl)-2-(4-Phenyl-1-Piperazinyl)
Acetamide and Hydrochloride This was prepared according to Example I from N-phenylpiperazine and N-(3,4,5 - trimethoxyphenyl) - 2-chloroacetamide. The free base was obtained in 96% yield and melted at 175–176°. The monohydrochloride melted at 245–247°. Analysis.—Calcd. for $C_{21}H_{28}ClN_3O_4$: Cl, 8.41. Found: Cl, 8.36.

EXAMPLE IV

N-(3,4-Dimethoxyphenyl)-3-(4-Phenyl-1-Piperazinyl)
Propionamide and Hydrochloride This was prepared by the general procedure of Example I from N-(3,4-dimethoxyphenyl)-3-chloropropionamide and N-phenylpiperazine. The free base was obtained in 65% yield and melted at 138–140°. The monohydrochloride melted at 272–273°. *Analysis.*—Calcd. for $C_{21}N_{28}ClN_3O_3$: Cl, 8.74. Found: Cl, 8.59.

EXAMPLE V

*N-(3,4-Dimethoxyphenyl)-2-(4-Phenyl-1-Piperazinyl) Propionamide and Hydrochloride*

This was prepared from N-(3,4-dimethoxyphenyl)-2-chloropropionamide and N-phenylpiperazine. The free base was obtained as an oil and was converted to the dihydrochloride in 57% yield. This melted at 212–214°. *Analysis.*—Calcd. for $C_{21}H_{29}Cl_2N_3O_3$: Cl, 16.07. Found: Cl, 15.88.

The novel compounds of this invention, as pointed out above, have utility as physiologically active agents; they exhibit sedative and antihypertensive activities similar to those of reserpine, being constituted in part of a moiety which is similar to the active portion of the reserpine molecule, namely, the 3,4,5-trimethoxybenzoyl moiety and a 1,4-disubstituted piperazinyl moiety, characterized by its central depressant activity and adrenergic blocking action. An outstandingly active compound is that of Example II.

What is claimed is:

1. A member of the class consisting of a phenylpiperazinylacyl aniline of the formula

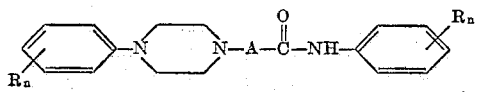

wherein A is a member of the class consisting of straight and branched chain divalent saturated aliphatic hydrocarbon groups of from 2 to 4 carbon atoms, R is selected from the group consisting of hydrogen, fluorine, chlorine and bromine atoms and lower alkyl, lower alkoxy and hydroxy radicals, and $n$ represents a cardinal number of from 0 to 3; and its non-toxic, water soluble acid addition salts.

2. N - (p-methoxyphenyl)-3-(4-phenyl-1-piperazinyl)-propionamide.

3. N - (3,4,5 - trimethoxyphenyl)-3-(4-phenyl-1-piperazinyl)propionamide.

4. N - (3,4,5 - trimethoxyphenyl) - 2-(4-phenyl-1-piperazinyl)acetamide.

5. N - (3,4-dimethoxyphenyl)-3-(4-phenyl-1-piperazinyl) propionamide.

6. N - (3,4-dimethoxyphenyl)-2-(4-phenyl-1-piperazinyl) propionamide.

References Cited in the file of this patent

Pollard et al.: Jour. Amer. Chem. Soc., vol. 75, pages 2989–2990 (1953).

Pollard et al.: Jour. Amer. Chem. Soc., vol. 77, pages 40–42 (1955).